United States Patent [19]

Dinklage et al.

[11] 4,395,515

[45] Jul. 26, 1983

[54] RESIN DISPERSIONS HAVING HIGH PIGMENT BINDING CAPACITY

[75] Inventors: Horst Dinklage, Dieburg; Herbert Fink, Bickenbach; Peter Frank, Seeheim-Jugenheim; Hubert Rauch, Weiterstadt; Werner Siol, Pfungstadt, all of Fed. Rep. of Germany

[73] Assignee: Röhm GmbH, Darmstadt, Fed. Rep. of Germany

[21] Appl. No.: 334,228

[22] Filed: Dec. 24, 1981

[30] Foreign Application Priority Data

Jan. 22, 1981 [DE] Fed. Rep. of Germany ....... 3101892

[51] Int. Cl.$^3$ ............................................. C08L 33/02
[52] U.S. Cl. ................................ 524/832; 525/330.2; 526/240; 526/317
[58] Field of Search ........................ 524/832; 525/317; 526/240, 317

[56] References Cited

U.S. PATENT DOCUMENTS

| 3,472,825 | 10/1969 | Walter et al. | 526/240 |
|---|---|---|---|
| 3,481,735 | 12/1969 | Graver et al. | 96/1.5 |
| 3,784,498 | 1/1974 | Ceska | 524/832 |
| 3,825,514 | 7/1974 | Drury et al. | 260/29.6 TA |
| 3,872,063 | 3/1975 | Kim | 526/240 |
| 3,875,099 | 4/1975 | Kurth et al. | 260/29.6 TA |
| 3,890,292 | 6/1975 | Bohme et al. | 526/240 |
| 4,135,043 | 1/1979 | Kast et al. | 526/240 |
| 4,167,464 | 9/1979 | George | 526/240 |
| 4,230,810 | 10/1980 | Lattime | 526/317 |

FOREIGN PATENT DOCUMENTS

| 1519288 | 7/1970 | Fed. Rep. of Germany . |
|---|---|---|
| 1804159 | 7/1970 | Fed. Rep. of Germany . |
| 1910488 | 9/1970 | Fed. Rep. of Germany . |
| 1910532 | 9/1970 | Fed. Rep. of Germany . |
| 2161909 | 6/1973 | Fed. Rep. of Germany . |
| 2228515 | 1/1974 | Fed. Rep. of Germany . |
| 2434996 | 2/1976 | Fed. Rep. of Germany . |
| 2458604 | 6/1976 | Fed. Rep. of Germany . |
| 2801099 | 7/1978 | Fed. Rep. of Germany . |
| 1512257 | 12/1967 | France . |
| 1261672 | 1/1972 | United Kingdom . |
| 1266246 | 3/1972 | United Kingdom . |
| 1292883 | 10/1972 | United Kingdom . |

*Primary Examiner*—Joseph L. Schofer
*Assistant Examiner*—N. Sarofim
*Attorney, Agent, or Firm*—Curtis, Morris & Safford

[57] ABSTRACT

What are disclosed are methods for making an aqueous dispersion of a synthetic resin copolymer, said dispersion having high pigment binding capacity and adaptable to use in the preparation of printing inks or pastes, said copolymer comprising a predominant amount of water insoluble monomers together with from 3 to 8 percent by weight of an acid component which is a water soluble acid or salt, which method comprises gradually adding said water insoluble monomers, together with a portion of said acid component, to an aqueous medium containing the balance of the acid component in the form of a dissolved water soluble salt; aqueous synthetic resin dispersions made by these methods; and printing inks comprising such an aqueous synthetic resin dispersion which has been neutralized and combined with such an amount of an organic solvent as converts the dispersion into a solution or colloidal dispersion of the synthetic resin.

10 Claims, No Drawings

RESIN DISPERSIONS HAVING HIGH PIGMENT BINDING CAPACITY

The present invention relates to methods for making aqueous synthetic resin dispersions having high pigment binding capacity and adaptable to use as binders for aqueous pigmented printing inks and pastes, to such dispersions per se, and to printing inks and pastes made therefrom.

Printing pastes comprising dyes or pigments and containing a natural or synthetic resin binder dissolved in an organic solvent have heretofore exclusively been used for the printing of synthetic resin films, metallic surfaces, paper, and cardboard according to intaglio or flexo printing processes. More recently, aqueous or aqueous-alcoholic printing pastes have been preferred because they are not flammable and do not contaminate the air with solvent vapors when they are being used. Binders suitable for use in such pastes are present either in the form of a solution in an organic solvent which can be diluted with water, particularly an alcohol, or in the form of an aqueous dispersion which can be diluted with an organic solvent. For preparing printing pastes, these solutions or dispersions are combined with water or aqueous alkalies; dispersions may optionally additionally be diluted with lower alcohols. The polymers present in such binder systems contain considerable amounts of carboxyl groups which are neutralized with alkali, in particular ammonia or volatile organic amines, and in this form form a true solution or a colloidal dispersion in the aqueous or aqueous-alcoholic medium. A higher content of carboxyl groups and a greater degree of neutralization to be sure favor the capacity for pigment distribution and the gloss of the printing prepared therewith, but detract from other important properties such as the water resistance of the printing and the heat sealability of the printed substrate. The use of volatile alkalies, which escape into the air as the printing dries, reduces these disadvantages to a certain degree but brings with it the development of annoying odors on printing.

Typical binders of this type, capable of dilution with water, are known from German Offenlegungsschriften Nos. 1,519,288, 2,161,909 and 2,458,604. They contain copolymers of lower alkyl acrylates, styrene, or methyl methacrylate, and about 10 to 20 percent of an acid monomer, dissolved in lower alcohols.

Because of the aforementioned disadvantages which are connected with the use of considerable amounts of acid monomers, efforts hve already been made to replace a portion of the acid monomers by other polar monomers. Thus, binders according to French Pat. No. 1,512,257 contain hydroxy esters of acrylic acid or of methacrylic acid, while binders according to German Offenlegungsschrift No. 2,434,996 contain acrylamide or methacrylamide.

According to German Offenlegungsschrift No. 2,801,099, binders containing small amounts of acid monomers are prepared in the form of aqueous dispersions of a synthetic resin. However, in order to be able to convert these binders into a dissolved condition by the addition of alkali, strongly polar monomers such as methylolamide or hydroxy esters of acrylic acid or of methacrylic acid or vinyl pyrrolidone are included in the polymer structure. Since quite considerable amounts of lower alkyl acrylates are generally employed in the preparation of such binder dispersions, the binders are relatively soft and give tacky and sensitive printings. In addition, the combination of acid monomers and other hydrophilic monomers makes the print water sensitive.

German Auslegeschrift No. 2,228,515 teaches the preparation of polyacrylate dispersions having a content of at most 2.5 percent of acid monomers. In this method, the acid monomers are primarily added in the initial phase of the polymerization, whereby they form an amount of from 3 to 15 percent of the monomer mixture which is added. On the addition of alkali, these dispersions thicken and are distinguished by a high compatability with pigments and a high shear stability. However, as a result of their low content of carboxylic groups, they produce neither genuine solutions nor colloidal dispersions. Although they are well suited for the preparation of highly-filled paints for interior painting purposes, they are not suitable for pigment printing pastes.

The present invention has as its object the preparation of aqueous synthetic resin dispersions for the preparation, e.g., of aqueous-alcoholic binders for pigment printing pastes, which binders do not have the aforementioned disadvantages of known binders. Good adhesion to synthetic resin films, metals, paper and cardboard, and non-tacky scratch-resistant printing having high gloss and high resistance to water are required. When dissolved dyes are used, good transparency, heat sealability, and the ability to be lacquered or painted over with aqueous systems or systems containing an organic solvent are further requirements.

This object has been achieved with a method for the preparation of aqueous synthetic resin dispersions by the free radical emulsion polymerization of water insoluble, ethylenically unsaturated, free-radically polymerizable monomers and an $\alpha,\beta$-unsaturated carboxylic acid involving gradual addition of the monomers to an already present aqueous medium. In the process, from 1 to 4 percent of a water soluble salt of the $\alpha,\beta$-unsaturated carboxylic acid are dissolved in the aqueous medium and the water insoluble monomers, together with at least 2 percent by weight of the $\alpha,\beta$-unsaturated carboxylic acid (as the free acid or in salt form) are gradually added to said medium. In this process, the amount of any salt of the carboxylic acid is calculated as the corresponding free acid and its percentage by weight is referred to the total weight of the monomers.

Although the applicants do not wish to be bound by any particular theory, the advantageous properties of the dispersions prepared according to the present invention presumably are attributable to the particular type of chemical heterogenity which is caused by the polymerization method of the invention. The presence of a considerable portion of the unsaturated carboxylic acid in the aqueous medium as polymerization begins results in the formation of polymer portions having a high content of carboxyl groups in the initial phase of the polymerization, whereas in the later course of the polymerization a polymer is formed whose composition and carboxyl content corresponds to the composition of the monomer mixture which is being added to the aqueous medium. The polymer portions formed initially, having a high carboxyl content, impart a high pigment binding power to the emulsion polymer, as well as the ability to form transparent glossy coatings. However, this portion of the polymer is present in such a limited amount that its strong thickening effect in the alkaline region does not lead to an undesirable high viscosity of the printing paste. The principal portion of the polymer formed has an amount of units of unsaturated carboxylic acid which clearly is less than 8 percent by weight and effects no undesirable strong thickening in the alkaline region. This polymer portion is responsible for the good water resistance of the coatings formed from the dispersion as well as for its ability to be lacquered or painted and its ability to be heat sealed. It is possible that the different polymer portions are bonded to one another at least partially by graft polymerization.

In the preferred embodiment of the invention, alkyl esters of acrylic acid and/or of methacrylic acid having from 1 to 8 carbon atoms in the alkyl portion are predominantly or entirely employed as the water insoluble ethylenically unsaturated monomers. It is well known that these esters can be differentiated into those which impart hardness to the polymer, e.g. above all the lower alkyl esters of methacrylic acid having from 1 to 3 carbon atoms in the alkyl portion, and those monomers which impart plasticity and elasticity to the polymer, e.g. particularly alkyl esters of acrylic acid and higher alkyl esters of methacrylic acid. Styrene also belongs to those monomers imparting hardness. It is sought to achieve a balanced ratio in the amounts of the two monomer types so that films formed from the dispersion are scratch resistant, non-tacky, and have good adhesion to their substrate. As a rule, the monomers imparting hardness predominate. The $T_{\lambda max}$-value of the copolymer (determined according to DIN 53 445) preferably is above 40° C.

Further water insoluble monomers which, however, do not form the predominant portion of the polymer, are vinyl esters, vinyl chloride, and acrylonitrile, for example.

The total amount of units of one or more unsaturated carboxylic acids or of their salts, calculated as the corresponding free acid, is preferably between 3 percent and 8 percent by weight of the polymer. Acrylic acid or methacrylic acid are the preferred carboxylic acids. However, other unsaturated mono- or di-carboxylic acids such as maleic, fumaric, or itaconic acids can be employed instead of acrylic acid and methacrylic acid or in addition thereto. That fraction of the unsaturated carboxylic acid which is present in the aqueous medium prior to polymerization must be present in the form of a water soluble salt. As a rule, alkali metal or ammonium salts are used, among which latter salts derived from ammonia per se or from organic amines such as ethanolamine, can be used. Sodium, potassium, and ammonium acrylates and methacrylates are preferred. The portion of the unsaturated carboxylic acid which is to be added concurrently with the water insoluble monomer is preferably present in this mixture in the form of the free carboxylic acid. However, a portion of this carboxylic acid fraction can be added separately in the form of an aqueous salt solution. After the conclusion of the polymerization, and at the latest at the time of preparation of the printing paste, a pH value greater than 7 is established using aqueous alkali or organic amines.

The polymerization according to the invention is carried out according to the so called "feed method". According to this method, all or a portion of the aqueous phase of the dispersion to be prepared is preliminarily introduced into the polymerization vessel and the first portion of the unsaturated carboxylic acid, in salt form, is dissolved in this aqueous medium. A water soluble polymerization initiator, for example potassium persulfate or ammonium persulfate, or hydrogen peroxide, as well as one or more conventional emulsifying agents, is present in the aqueous medium, all as known in the art. As a rule, anionic emulsifiers are employed, but non-ionic emulsifiers can also be used. The well known rules according to which the choice of the kind and amount of the emulsifying agent affect particle size, viscosity, and other properties of the dispersion can suitably be applied here. Reference is made on this point to German Offenlegungsschrift No. 1,804,159, German Auslegeschrift No. 1,910,488, and German Pat. No. 1,910,532.

The water insoluble monomers are added to such an aqueous medium under such polymerization conditions that the monomers being introduced can polymerize at once. If the aqueous medium already contains the total amount of aqueous phase, the water insoluble monomers are added, in admixture with the unsaturated carboxylic acid reserved for this purpose, to the reaction mixture according to the "monomer feed method". That is, the liquid monomer mixture is gradually introduced over the course of several hours at such a rate that the heat of polymerization which is liberated is continually removed and the polymerization conditions can be maintained steady. Further emulsifier and additional polymerization initiator can optionally be added during the polymerization. This so called "monomer feed method" is particularly preferred if binders having high pigment binding capacity and printings with a high gloss are desired.

If the aqueous medium contains only a portion of the emulsified aqueous phase, the monomer mixture is emulsified in the remaining portion of the aqueous phase and is gradually introduced in this form ("emulsion feed method"), whereby —in the same manner as described above—care is taken to achieve steady polymerization conditions. In this case, the portion of the unsaturated carboxylic acid which is added can be partially neutralized. After conclusion of the polymerization, the polymerization conditions are suitably maintained for a certain period of time. Neutralization with a base occurs at the latest at the time of preparation of a printing paste.

In the non-neutralized condition, the viscosity of the dispersions is low even at high solids content and assures good handling properties.

The neutralized dispersion has a viscosity in the range of about 100 to 50,000 mPa.s at 20° C. The viscosity of the dispersion depends on a series of method parameters, which therefore must be carefully harmonized to one another. A higher total content of carboxylic acid units tends to increase viscosity, as does a higher carboxylic acid content of the monomers which are added. Further, a high degree of neutralization or a high pH value, a small particle size, and a higher solids content all lead to viscosity increases. Further, the glass transition temperatures of the polymers and the nature of the base used for neutralization have an influence on viscosity.

The neutralized dispersion can be used directly for the preparation of printing pastes. For this purpose, organic or inorganic colored pigments are stirred in in an amount from 2 to 20 percent by weight (based on the finished printing paste), optionally with further conventional additives. Subsequently, an organic solvent capable of dilution with water, particularly a lower aliphatic alcohol such as methanol, ethanol, propanol, isopropanol, or butanol, is added, whereby the dispersed resin particles are converted into a dissolved or colloidally dispersed condition. The organic solvent is suitably added in an amount from about 40 percent to 100 percent, preferably from 50 percent to 80 percent, by weight of the water present in the dispersion. As a rule it is preferred to add these solvents to the unpigmented dispersion and to pigment the resulting solution. Finally, it is also possible to convert the incompletely neutralized dispersion into a powdery solid product, for example by spray drying. This product can later be converted into a printing paste by admixture with a water-alcohol mixture and by the addition of alkali and pigments.

The printing paste is adjusted to have a viscosity value, suitable for the printing process employed, in the region from about 1500 to 3000 mPa . s. This viscosity corresponds to an outflow time of 25-30 seconds in a 4 mm-efflux cup according to DIN 53 211. The paste is characterized by a good distribution of the colored pigment and by good wetting of the substrate which is to be printed.

The advantageous properties of the printing which is so produced, particularly its appearance, its scratch resistance, its resistance to scouring when in a wet condition, its adhesion to a substrate, its gloss, and its surface adhesion are made evident and are compared with known printing pastes in the following Examples, given by way of illustration.

EXAMPLE 1

A. Preparation of the Binder Dispersion

An aqueous medium of the following composition is introduced into a polymerization vessel equipped with a stirrer and a heating or cooling mantle:

3019 g of water
8.4 g of ammonium/persulfate
119 g of sodium hydroxide (30%) [or 60.9 g of aqueous ammonia (25%)]
77 g of methacrylic acid (2 parts by weight) and
31.5 g of triisobutylphenol oxethylated with 6 mols of ethyleneoxide, sulfated and present as the sodium salt (as an emulsifier).

A monomer mixture of the following composition is then added over the course of four hours at about 80° C.:

2461 g of methyl methacrylate (64 parts by weight)
1155 g of n-butyl acrylate (30 parts by weight)
154 g of methacrylic acid (4 parts by weight) and
38.5 g of 2-ethyl-hexyl-thioglycolate.

After conclusion of the addition, a further 20.9 g of ammonium persulfate are added and the batch is held for a further hour at 80° C. Subsequently, such an amount of 30% sodium hydroxide or 25% aqueous ammonia is added as corresponds with the free methacrylic acid in the polymer. The dispersion is adjusted with water to a solids content of 45 percent by weight.

B. Preparation of a Printing Paste 100 parts by weight of the dispersion prepared in A. are mixed with 100 parts by weight of isopropyl alcohol and 50 parts by weight of a commercially available flexo printing dye ["Flexonylblau B2G"] diluted with water in a 1:1 ratio are stirred in.

The viscosity is adjusted to an outflow time of 20-30 seconds in a 4 mm-efflux cup (cf. DIN 53 211) by the addition of water.

For determining pigment compatability, the printing ink is thinly distributed between two microscope slides and visually evaluated.

For comparison, a binder solution is prepared according to Example 1 of German Offenlegungsschrift No. 2,458,604 by adding 552 parts of methyl methacrylate, 120 parts of styrene, and 128 parts of methacrylic acid to 80 parts of boiling isopropanol, with stirring and while keeping the mixture at boiling temperatures, together with 8 parts of sec.-butanol as a chain transfer agent, 24 parts of azo-bis (isobutyronitrile) as an initiator, and 120 parts of isopropanol as a solvent. The boiling batch is stirred for 5 hours under reflux, with the further addition of 4 parts of azo-bis(isobutyronitrile) after one or three hours. The batch is then combined with 250 parts of isopropanol and adjusted with aqueous ammonia to a pH of 8 and 20 percent solids content. The solution has a viscosity of 81.6 seconds (4 mm efflux cup, 23° C.). 200 parts by weight of the solution are combined with 50 parts by weight of the diluted flexo printing dye to form a printing ink and are adjusted with water to a viscosity of 25-30 seconds (4 mm efflux cup, DIN 53 211).

Further, in a corresponding manner a printing paste having the same efflux time is prepared using a commercially available binder ("Zinpol 1519") which is a 40 percent solution of a copolymer of ethyl acrylate, methyl methacrylate, and methacrylic acid in a mixture of water and isopropyl alcohol.

C. Printing Test

Quarter tone, half-tone, and full tone printings are made at an application thickness of about 10 microns, 20 microns, and 40 microns on soft calendered polyvinyl chloride films with a laboratory intaglio printing press using a patterned roll and are dried at 80° C. The intaglio rollers can readily be cleaned with an ammoniacal water-ethanol mixture.

The results of the printings are compared in the following Table.

TABLE

| Binder of the Invention | | | | Print Properties | | | | | |
|---|---|---|---|---|---|---|---|---|---|
| Present in Aqueous Medium | Neutralized to 100% with | Pigment Distribution | Appearance | Scratch Resistance (Dry) | Wet Scour Resistance | Adhesion to the Substrate | Gloss | Lack of Tack | Heat-Sealability |
| Na—MA | NaOH | +++ | +++ | +++ | ++ | +++ | +++ | ++ | +− |
| Na—MA | NH₃ | +++ | +++ | +++ | ++ | +++ | + | ++ | + |
| NH₄—MA | NaOH | +++ | ++ | +++ | ++ | +++ | + | ++ | + |
| NH₄—MA | NH₃ | +++ | + | +++ | +++ | +++ | +− | ++ | ++ |
| Binder of German 2,548,604 (Ex. 1) | | +− | − | − | −− | − | +++ | ++ | not tested |
| Commercial Binder ("Zinpol 1519") | | | | | | | | | |

TABLE -continued

| Binder of the Invention | | | | Print Properties | | | | | |
|---|---|---|---|---|---|---|---|---|---|
| Present in Aqueous Medium | Neutralized to 100% with | Pigment Distribution | Appearance | Scratch Resistance (Dry) | Wet Scour Resistance | Adhesion to the Substrate | Gloss | Lack of Tack | Heat-Sealability |
| for Flex Printing | | +++ | +++ | + | -- | ++ | +++ | +- | -- |

Key:
Na—MA = sodium methacrylate
NH$_4$—MA = ammonium methacrylate
+++ = very good
++ = good
+ = satisfactory
+- = sufficient
- = insufficient
-- = bad

EXAMPLES 2 AND 3

Two further binder dispersions are prepared according to the process of Example 1, but using the following monomer mixture in the added portion.

| Monomer | Example 2 | Example 3 |
|---|---|---|
| Methyl methacrylate | 72 parts by weight | 73 parts by weight |
| Butyl methacrylate | 22 parts by weight | 22 parts by weight |
| Methacrylic acid | 3 parts by weight | 3 parts by weight |
| In addition, the aqueous medium contains the following: | | |
| Methacrylic acid (as the sodium salt) | 3 parts by weight | 2 parts by weight |

After the polymerization, the dispersions are neutralized 100 percent with sodium hydroxide and isopropyl alcohol is added for conversion into a solution.

Printing pastes are prepared and printing tests carried out as in Example 1. The properties of the printing ink or of the print are as follows:

| Property | Example 2 | Example 3 |
|---|---|---|
| Pigment distribution | ++ | ++ |
| Dry scratch resistance | + | ++ |
| Wet scour resistance | ++ | +++ |
| Appearance | ++ | ++ |
| Gloss | ++ | ++ |

(Evaluation is as in Example 1)

EXAMPLE 4

A binder dispersion is prepared according to the method of Example 1 with the addition of 2 parts by weight of methacrylic acid, as the sodium salt, in the aqueous medium and using a monomer addition comprising:
59 parts by weight of methyl methacrylate,
35 parts by weight of butyl acrylate, and
4 parts by weight of methacrylic acid.
After the polymerization, the dispersion is neutralized 100 percent with ammonia, isopropyl alcohol is added, and a printing ink is prepared as in Example 1. The binder shows itself to be compatible with pigment. In printing tests on a soft PVC film, a heat sealable print with good gloss, good scratch resistance, sufficient wet scouring strength, and low tack is obtained.

EXAMPLE 5

An aqueous medium comprising:
890 g of water
6 g of ammonium persulfate
43.4 g of aqueous ammonia (25%)
55 g of methacrylic acid, and
11.5 g of triisobutyl phenol oxethylated with 6 mols of ethyleneoxide, sulfated, and present in sodium salt form as an emulsifier,
is introduced into a polymerization vessel equipped with a stirrer and a heating or cooling mantle.
An emulsion comprising:
1348 g of water
1760 g of methyl methacrylate (64 parts by weight)
825 g of n-butyl acrylate (30 parts by weight)
110 g of methacrylic acid (4 parts by weight)
27.5 g of 2-ethyl-hexyl-thioglycolate, and
11.25 g of triisobutyl phenol oxethylated with 6 mols of ethyleneoxide, sulfated, and present in sodium salt form as an emulsifier
is added over 4 hours at about 80° C. After conclusion of the addition, a further 3 g of ammonium persulfate are added and the batch is maintained for a further hour at 80° C. Subsequently, 25% aqueous ammonia is added in an amount corresponding to the free methacrylic acid units present in the polymer. The dispersion is adjusted with water to a solids content of 40 percent by weight.

After the addition of isopropanol, a printing ink is prepared as in Example 1. When tested for printing on a soft PVC film, a heat sealable print with satisfactory gloss, good scratch resistance and wet scouring resistance, as well as low tack is obtained.

EXAMPLE 6

An aqueous medium comprising:
886 g of water
6 g of ammonium persulfate
43 g of aqueous ammonia (25%)
55 g of methacrylic aid (2 percent of total monomer weight), and
2,25 g of triisobutyl phenol oxethylated with 6 mols of ethyleneoxide, sulfated and present in sodium salt form as an emulsifier,
is introduced into a polymerization vessel equipped with a stirrer and a heating or cooling mantle.
An emulsion comprising:
1348 g of water
1760 g of methylmethacrylate (64 percent by weight)
825 g of n-butyl methacrylate (30 percent by weight)
110 g of methacrylic acid (4 percent by weight)
13 g of aqueous ammonia (25%)
27,5 g of 2-ethyl-hexyl-thioglycolate, and
20,25 g of triisobutyl phenol oxethylated with 6 mols of ethylenoxide, sulfated, and present in the sodium salt form as an emulsifier
is added over 4 hours at about 80° C.
After conclusion of the addition, a further 3 g of ammonium persulfate are added and the batch is maintained at 80° C. for further two hours. Subsequently, aqueous ammonia (25%) is added at room temperature in an amount corresponding to the free methacrylic acid in the polymer.

After the addition of isopropanol, a printing ink is prepared as in Example 1. In printing tests on a soft PVC film, a heat sealable print with very good gloss, good scratch resistance, very good wet scouring resistance and low tack is obtained.

The $T_{\lambda max}$-values of polymer films prepared by drying a thin layer of the resin dispersion at elevated temperature were determined using the method according to DIN 53 445. The following $T_{\lambda max}$-values were found:

Example 1: 62° C.
Example 2: 72° C.
Example 3: 72° C.
Example 4: 48° C.
Example 5: 60° C.
Example 6: 60° C.

What is claimed is:

1. A method for making an aqueous dispersion of a synthetic resin copolymer by the free radical copolymerization of from 92 to 97 percent, by weight of the copolymer, of water insoluble ethylenically unsaturated monomers and from 3 to 8 percent, by weight of the copolymer, of an acid component selected from the group consisting essentially of α,β-ethylenically unsaturated mono- and di-carboxylic acids and the water soluble salts thereof, the weight of salt in each instance being calculated as the weight of the corresponding free acid, said dispersion having high pigment binding capacity, which method comprises gradually adding said water insoluble monomers, under free radical copolymerization conditions, together with a portion of said acid component which is at least 2 percent by weight of the copolymer, to an aqueous medium comprising from 1 to 4 percent, by weight of the copolymer, of at least one water soluble salt of a mono- or di-carboxylic acid forming the remainder of said acid component.

2. A method as in claim 1 wherein said copolymer has a $T_{\lambda max}$-value above 40° C.

3. A method as in claim 1 wherein said aqueous medium comprises the total amount of water to be present in the aqueous dispersion which is to be prepared.

4. A method as in claim 1 wherein said aqueous medium comprises only a portion of the water to be present in the aqueous dispersion which is to be prepared and the balance of said water is added together with said water insoluble monomers and said portion of said acid component in the form of an aqueous emulsion of said monomers.

5. A method as in claim 4 wherein some of said portion of said acid component is present in the form of a water soluble salt.

6. An aqueous dispersion prepared by the method of claim 1.

7. An aqueous dispersion prepared by the method of claim 3.

8. An aqueous dispersion prepared by the method of claim 4.

9. An aqueous dispersion prepared by the method of claim 5.

10. A printing ink or paste comprising (a) an aqueous dispersion of a synthetic resin as in claim 6 adjusted to a pH of at least 7; (b) an amount of an organic solvent, capable of dilution with water, sufficient to convert said dispersion (a) into a solution or colloidal dispersion of said synthetic resin; and (c) from 2 to 20 percent, by weight of said ink or paste, of at least one member selected from the group consisting of dyes and pigments.

* * * * *